(12) United States Patent
Sedan et al.

(10) Patent No.: US 11,609,931 B2
(45) Date of Patent: Mar. 21, 2023

(54) RING REPLICATION SYSTEM

(71) Applicant: Datadog, Inc., New York, NY (US)

(72) Inventors: Boaz Sedan, Palo Alto, CA (US); Geraud Louis Boyer, San Jose, CA (US)

(73) Assignee: Datadog, Inc., New York, NY (US)

( * ) Notice: Subject to any disclaimer, the term of this patent is extended or adjusted under 35 U.S.C. 154(b) by 21 days.

(21) Appl. No.: 16/455,336

(22) Filed: Jun. 27, 2019

(65) Prior Publication Data

US 2020/0409975 A1 Dec. 31, 2020

(51) Int. Cl.
*G06F 16/27* (2019.01)
*G06F 16/23* (2019.01)

(52) U.S. Cl.
CPC ........ *G06F 16/273* (2019.01); *G06F 16/2379* (2019.01)

(58) Field of Classification Search
CPC .... G06F 3/061; G06F 11/1464; G06F 16/273; G06F 16/2379
See application file for complete search history.

(56) References Cited

U.S. PATENT DOCUMENTS

| | | | |
|---|---|---|---|
| 6,944,662 B2 | 9/2005 | Devine et al. | |
| 7,720,815 B1 | 5/2010 | Ramesh | |
| 7,747,741 B2 | 6/2010 | Basani et al. | |
| 8,660,981 B2 | 2/2014 | Sabir et al. | |
| 8,806,055 B2 | 8/2014 | Sabir et al. | |
| 8,984,329 B2 | 3/2015 | Sabir et al. | |
| 9,003,144 B1 | 4/2015 | Hayes et al. | |
| 9,563,681 B1 | 2/2017 | Patiejunas et al. | |
| 9,569,517 B1 | 2/2017 | Smola et al. | |
| 10,019,194 B1 | 7/2018 | Baruch et al. | |
| 2003/0061550 A1* | 3/2003 | Ng | G06F 11/3664 714/45 |
| 2009/0055401 A1 | 2/2009 | Mann et al. | |
| 2010/0114824 A1 | 5/2010 | Krishnaprasad et al. | |

(Continued)

OTHER PUBLICATIONS

"Ring network", Wikipedia, published on the Internet at https://en.wikipedia.org/wiki/Ring_network at least as early as Dec. 21, 2018.

(Continued)

*Primary Examiner* — Amresh Singh
*Assistant Examiner* — Courtney Harmon
(74) *Attorney, Agent, or Firm* — Fish & Richardson P.C.

(57) ABSTRACT

A ring replication system receives and redundantly stores electronic data for access by users. Two or more storage devices are configured in a ring and circulate received data to each other. At least one such device receives incoming data records from an external source. One storage device is designated as the ordering device for assigning a sequence order to each data record, and the assigned sequence order is circulated around the ring. After confirming that the assigned sequence order has been indexed within each storage device on the ring, data records may then be accessed by users. One or more access portals may be coupled to one or more storage devices in the replication ring for providing users with access to stored data records. Data records are accessed in accordance with the assigned sequence order. A related method for redundant storage of data records is also disclosed.

21 Claims, 8 Drawing Sheets

(56) References Cited

U.S. PATENT DOCUMENTS

| | | | |
|---|---|---|---|
| 2010/0180146 | A1 | 7/2010 | Rousseau et al. |
| 2011/0178984 | A1 | 7/2011 | Talius et al. |
| 2011/0191469 | A1* | 8/2011 | Oran ................ H04L 65/80 709/224 |
| 2013/0046901 | A1 | 2/2013 | Sabir et al. |
| 2014/0310391 | A1 | 10/2014 | Sorenson, III et al. |
| 2015/0074052 | A1 | 3/2015 | Srinivasan et al. |
| 2015/0278324 | A1 | 10/2015 | Wong et al. |
| 2016/0072635 | A1* | 3/2016 | Van Zijst ........... H04L 12/1836 370/235 |
| 2016/0073175 | A1* | 3/2016 | Phillips ............... H04N 21/812 725/34 |
| 2016/0085399 | A1 | 3/2016 | Jain et al. |
| 2017/0126491 | A1* | 5/2017 | Oedlund ............... H04W 48/16 |
| 2018/0032382 | A1 | 2/2018 | Kamawat et al. |
| 2018/0095855 | A1 | 4/2018 | Sanakkayala et al. |
| 2018/0324093 | A1* | 11/2018 | Namjoshi .......... H04L 41/0866 |
| 2019/0205466 | A1* | 7/2019 | Handte ................ H04L 51/234 |
| 2019/0278483 | A1* | 9/2019 | Mahmood ............. G06F 3/0604 |

OTHER PUBLICATIONS

"Data storage and high-speed streaming", Spring 2014—Lecture #8, University of Oslo, published on the Internet at https://www.uio.no/studier/emner/matnat/fys/FYS3240/v14/forelesninger/l8—datastorage_hs_streaming-v2.pdf in May 2014.

"Fault Handling in Distributed Systems", 8-Bit Mage, by Elijah Cornell, published on the Internet at http://8bitmage.com/papers/2013-10-30-fault-handling-in-distributed-systems prior to 2014.

International Search Report and Written Opinion for Intl App No. PCT/US2020/040122, dated Sep. 25, 2020 (19 pages).

Giuseppe Maxia "Advanced MySQL Replication Techniques", Apr. 20, 2006 (Apr. 20, 2006), pp. 1-17, Retrieved from the Internet: URL:http://wiki.deimos.fr/images/3/38/Mysql_mastertomaster.pdf [retrieved on Sep. 16, 2020].

International Preliminary Report on Patentability for Intl App No. PCT/US2020/040122, dated Dec. 28, 2021 (13 pages).

* cited by examiner

FIG. 3A

| Time, Node | Message |
|---|---|
|  |  |

FIG. 3B

| Order | Message |
|---|---|
|  |  |

FIG. 4A

| Time, Node | Message |
|---|---|
| 0:00:01, R1 | A |

FIG. 4B

| Order | Message |
|---|---|
|  |  |

FIG. 5A

| Time, Node | Message |
|---|---|
| ~~0:00:01, R1~~ | ~~A~~ |

FIG. 5B

| Order | Message |
|---|---|
| 1 | A |

FIG. 6A

| Time, Node | Message |
|---|---|
| ~~0:00:01, R4~~ | ~~A~~ |

FIG. 6B

| Order | Message |
|---|---|
| 1 √ | A √ |

FIG. 7A

| Time, Node | Message |
|---|---|
| ~~0:00:01, R4~~ | ~~A~~ |
| 0:00:02, R1 | B |

FIG. 7B

| Order | Message |
|---|---|
| 1 √ | A √ |

FIG. 8A

| Time, Node | Message |
|---|---|
| ~~0:00:01, R4~~ | ~~A~~ |
| 0:00:02, R1 | B |
| 0:00:02, R3 | D |

FIG. 8B

| Order | Message |
|---|---|
| 1 √ | A √ |

FIG. 9A

| Time, Node | Message |
|---|---|
| ~~0:00:01, R1~~ | ~~A~~ |
| 0:00:02, R1 | B |
| 0:00:02, R3 | D |

FIG. 9B

| Order | Message |
|---|---|
| 1 √ | A √ |
| 2 | C |

FIG. 10A

| Time, Node | Message |
|---|---|
| ~~0:00:01, R1~~ | ~~A~~ |
| ~~0:00:02, R1~~ | ~~B~~ |
| 0:00:02, R3 | D |

FIG. 10B

| Order | Message |
|---|---|
| 1 √ | A √ |
| 2 | C |
| 3 | B |

FIG. 11A

| Time, Node | Message |
|---|---|
| 0:00:01, R1 | A |
| 0:00:02, R1 | B |
| 0:00:02, R3 | D |

FIG. 11B

| Order | Message |
|---|---|
| 1 √ | A √ |
| 2 | C |
| 3 | B |
| 4 | D |

FIG. 12A

| Time, Node | Message |
|---|---|
| 0:00:01, R1 | A |
| 0:00:02, R1 | B |
| 0:00:02, R3 | D |

FIG. 12B

| Order | Message |
|---|---|
| 1 √ | A √ |
| 2 √ | C √ |
| 3 | B |
| 4 | D |

FIG. 13A

| Time, Node | Message |
|---|---|
| ~~0:00:01, R1~~ | ~~A~~ |
| ~~0:00:02, R1~~ | ~~B~~ |
| ~~0:00:02, R3~~ | ~~D~~ |

FIG. 13B

| Order | Message |
|---|---|
| 1 √ | A √ |
| 2 √ | C √ |
| 3 √ | B √ |
| 4 | D |

FIG. 14A

| Time, Node | Message |
|---|---|
| ~~0:00:01, R1~~ | ~~A~~ |
| ~~0:00:02, R1~~ | ~~B~~ |
| ~~0:00:02, R3~~ | ~~D~~ |

FIG. 14B

| Order | Message |
|---|---|
| 1 √ | A √ |
| 2 √ | C √ |
| 3 √ | B √ |
| 4 √ | D √ |

RING REPLICATION SYSTEM

BACKGROUND OF THE INVENTION

Field of the Invention

The present invention relates generally to a data storage and transmission system, and more particularly to such a data storage and transmission system that guards against data loss in the event of network or machine failure.

Description of the Relevant Art

It is necessary for high-speed information systems to gather one or more incoming streams of data, to digest the data, to store the data, and to then distribute the data to one or more user devices. Such high-speed data streams may transmit data at rates of 30 gigabits per second, or more in real time. Such streamed data is often in the form of video feeds from real time imaging devices.

Systems are already known in the art for processing, storing, and distributing high-speed data streams, including some that use open-source software. For example, so-called chain replication systems have been described in which in a number of machines, storage elements, or "nodes", are chained together in a circular array to continuously circulate received data. In these chain replication systems, a data record must make it all the way around the chain before the data is considered to be valid. In known chain replication systems, a single node serves as both the input for receiving data from the outside world, as well as the output for providing access to stored data; the other nodes in the chain provide redundant storage but do not participate in the exchange of data with external data sources or users.

Another approach known in the art is a "quorum-based" system, wherein incoming data is sent to a matrix of storage devices. This approach is called "quorum-based" because, in response to an access request, the matrix of storage devices "vote" on what data was received, and the data is considered valid if a majority of the voting storage devices agree with each other on the content of such data. Thus, data loss is avoided by establishing a quorum of N out of M machines used to store the data. Quorum-based systems must necessarily have an odd number of machines in the matrix to ensure that there will be a majority (and not a tie) among the voting machines. In addition, quorum-based replication systems lack the ability to associate a sequence order to the saved data records, and require higher network overhead to manage quorum voting.

SUMMARY OF THE INVENTION

A successful redundant data storage system should be scale-able in size to easily handle increased volumes of data. A good redundant storage system must also be extremely reliable; after all, the reason for having multiple storage devices is to ensure that an accurate copy of the originally-received data can be retrieved in the event of network or machine failure. Another factor to be considered is speed, both from the standpoint of how quickly can the redundant data storage system reliably store incoming data, and how quickly can the stored data be accessed by users in a reliable manner. In addition, if one of the storage devices that is included in such a redundant storage system should fail, it is important that the redundant storage system be able to recover from such failure quickly and easily. Also, in data-based applications involving events, it is sometimes critical to know not only the contents of the data, but to also know the relative timing of the receipt of two different data records, i.e., the relative timing as between two events, and to ensure that two users who request access to such data both receive such data in the same sequential order.

Accordingly, it is an object of the present invention to provide a redundant data storage system that is highly reliable by ensuring access to an accurate copy of the originally-received data in the event of network or machine failure.

It is further object of the present invention to provide such a redundant data storage system that is easily scale-able in size to easily handle increased volumes of data.

It is still a further object of the present invention to provide such a redundant data storage system that is capable of ingesting multiple high-speed incoming streams of data, and making such data accessible to multiple users after only a relatively short delay.

A yet further object of the present invention is to provide such a redundant data storage system that maintains data records in a time-ordered manner whereby data records may be retrieved in a particular sequential order corresponding to the order in which they were originally received.

Still another object of the present invention is to provide such a redundant data storage system that is relatively simple and inexpensive to configure and use.

A further object of the present invention is to provide such a redundant data system that avoids any limitations on the number of "nodes" being odd or even.

It is also an object of the present invention to provide such a redundant storage system capable of recovering from a "node" failure relatively quickly and easily.

Yet another object of the present invention is to provide a method for receiving and storing electronic data in a redundant manner, and providing access thereto, using a ring of two or more data storage devices arranged in a ring.

Briefly described, and in accordance with various embodiments thereof, the present invention provides a redundant data storage system for receiving and storing electronic data, and for providing access to stored electronic data. At least first and second electronic storage devices are provided for storing digital data records. The first and second electronic storage devices are coupled, either directly or indirectly, to each other, and are configured to exchange digital data records stored therein. A streamed digital data receiver is configured to receive a sequenced stream of digital data records from an external source. The streamed digital data receiver is coupled to one of the first and second electronic storage devices for providing the sequenced stream of digital data records thereto for storage; if desired, a second such data receiver may be coupled with the other of the first and second electronic storage devices for providing a second sequenced stream of digital data records thereto for storage.

One of the first and second electronic storage devices is designated as an ordering node, and the ordering node serves to associate an ordering identifier with each digital data record stored thereby. The ordering identifier associated with each digital data record is communicated by the ordering node to the other electronic storage device(s) so that each electronic storage device ultimately stores each digital data record along with its ordering identifier. At least one access device is coupled to either of the first and second electronic storage devices for sequentially accessing digital data records stored therein in accordance with the ordering identifiers associated with such digital data records.

In various embodiments of the invention, the redundant data storage system includes at least first, second, and third electronic storage devices each for storing digital data records. These first, second, and third electronic storage devices are configured in a ring; the second electronic storage device is coupled to the first electronic storage device and is configured to receive digital data records stored therein. The third electronic storage device is coupled to the second electronic storage device and is configured to receive digital data records stored therein. Similarly, the first electronic storage device is coupled to the third electronic storage device and is configured to receive digital data records stored in the third electronic storage device.

A first streamed digital data receiver is configured to receive a first sequenced stream of digital data records from an external source. The first streamed digital data receiver is coupled to one of the first, second, and third electronic storage devices for providing the first sequenced stream of digital data records thereto for storage. If desired, a second streamed digital data receiver may provide a second stream of incoming data to another one of the electronic storage devices, independent of the first sequenced stream. Likewise, if desired, a third streamed digital data receiver may provide a third stream of incoming data to the remaining one of the electronic storage devices, independent of the first and second sequenced streams of data.

One of the first, second, and third electronic storage devices is designated as the ordering device. The ordering device differs from the other electronic storage devices in the ring by associating an ordering identifier with each digital data record processed by the ordering device; this ordering identifier is circulated around the ring along with the data record, and is stored by each ring node in association with each digital data record stored therein.

A first access device is coupled to one of the first, second, and third electronic storage devices for sequentially accessing digital data records stored therein in accordance with the ordering identifiers associated with such digital data records. If desired a second access device may be coupled to another one of the first, second, and third electronic storage devices, i.e., to another node in the ring, for allowing access to stored data records independent of the first access device. If further desired, a third access device may be coupled to the remaining node in the ring for a third user to access stored data independent from the first and second access devices.

Various embodiments of the invention include a protocol for efficiently sharing information around the ring. As each electronic storage device, or node, receives a new data record from a streamed digital data receiver, it creates an electronic new record message for such received data record. The electronic new record message may include a time-stamp when the new data record was received, an identification of which node on the ring initially received the data record, and the contents of the received data record. This electronic new record message can be transmitted over the ring to the next electronic storage device on the ring, and then re-transmitted, at least until the electronic new record has reached the ordering device. As each node on the ring receives the electronic new record message, it stores the information within the electronic new record message, including the time of receipt, the identification of the initial receiving node, and the data record contents.

When a new electronic record message has been transmitted along the ring to the ordering device, the ordering device assigns an order identifier to the corresponding data record. The ordering device also creates an electronic order message for such data record, including the time-stamp of initial receipt, the identification of the initial receiving node, the data record contents, and the ordering identifier assigned to the data record. As each node receives the electronic order message issued by the ordering device, each such node stores the data record contents of the electronic order message in an ordered list of data records, at a position specified by the ordering identifier. Unless the next electronic device in the ring is either the ordering device or the electronic storage device at which the data record was first presented, the electronic order message is circulated to the next electronic storage device on the ring.

In some embodiments of the invention, if a node detects that a received electronic order message identifies the next electronic storage device in the ring as the node that first received the data record, there is no need to further circulate the electronic order message. Instead, the node generates an order directive including the original time-stamp, node identifier, and the assigned ordering identifier, and transmits this order directive to the next node on the ring, which has already saved the contents of the data record, and simply needs to know the assigned order. This order directive may continue to be transmitted around the ring until reaching the ordering device. When an order directive is received by the ordering device from the ring, the ordering device knows that the assigned order for the corresponding data record has been communicated to every node on the ring. The ordering device may then issue a commit message in response thereto, confirming the order identifier previously assigned to such data record. The commit message may be transmitted over the ring from node to node, and as each node on the ring receives the commit message, it becomes authorized to allow users to access such data record.

In some embodiments of the invention, an electronic new record message may be generated by a node on the ring that is adjacent to, and just upstream from the ordering device. In this event, the electronic new record message circulates all the way around the ring and finally reaches the ordering device.

Upon receipt of such electronic new record message, the ordering device need not creates an ordering message because all of the nodes have already stored the data record, indexed by the time-stamp and receipt node. In this case, the ordering device creates an electronic order directive including the time-stamp, the initial receipt node, and the ordering identifier assigned to such data record. This ordering directive is sent by the ordering device onto the ring, and is circulated from node to node around the ring. When the ordering directive circulates back to the ordering device, the ordering device issues a commit message specifying the order identifier previously assigned to such data record; the commit message is transmitted over the ring to the other nodes in serial fashion, and as each node receives the commit message, that node becomes authorized to permit access to the stored data record in proper order.

In various embodiments, the present invention also provides a method for receiving and storing electronic data in a redundant manner, and for providing access to stored electronic data. In practicing such method, first, second and third electronic storage devices are provided in a ring configuration. The second electronic storage device, or second node, is coupled to the first electronic storage device, or first node, for allowing the second node to receive digital data records stored in the first node. Similarly, the third electronic storage device, or third node is coupled to the second node for allowing the third node to receive digital data records stored in the second node. Likewise, the first node is coupled to the third node for allowing the first node to receive digital data records stored in the third node.

At least one of the first, second, and third nodes may receive a sequenced stream of digital data records for storage from an external source. Also, at least one of the nodes is configured to provide user access to stored data by transmitting a sequenced stream of stored digital data records stored therein to an access device.

According to various embodiments of the method, one of the first, second and third nodes is designated to be the ordering device responsible for assigning an ordering identifier with each digital data record stored by the ring. These ordering identifiers are circulated around the ring for association with each stored digital data record. Each node in the ring associates the same ordering identifier with each copy of the corresponding digital data record stored thereby.

In some embodiments of the method, the ordering device confirms to each of the other nodes on the ring when the ordering identifier for a particular digital data record has been fully-circulated to each of the nodes on the ring, thereby notifying each node of its authority to allow users to access each such stored data record, in accordance with the order assigned to such data record.

In various embodiments of the method, the step of configuring a node to receive a sequenced stream of digital data records for storage from an external source may include maintaining a digital clock to keep time; noting the time, i.e., creating a time-stamp, when a digital data record is first received by one of the nodes, and creating a node identifier to indicate which node first received such digital data record. The received digital data record, along with the time-stamp and the receipt node identifier are stored in the node, and are also packaged as a new record message. The new record message is transmitted by such node over the ring to the next node in succession. As each node on the ring receives such new record message, it also saves the time-stamp, the receipt node identifier, and the contents of the data record. Each successive node re-transmits the new record message onto the ring, at least until the new record message reaches the ordering device.

In some embodiments of the method, as the ordering device receives an electronic new record message from a prior node on the ring, the ordering device assigns the ordering identifier for such data record, and creates a corresponding electronic order message, including the original time-stamp, the receipt node identifier, the data record contents, and the ordering identifier assigned to such data record. The ordering device saves the data record and ordering identifier, and also circulates the electronic order message over the ring to the next node.

In various embodiments of the method, when a node receives the electronic order message issued by the ordering device, the node stores the data record contents of the electronic order message in an ordered list of data records at a position specified by the ordering identifier. Unless the next node in the ring is either the ordering device itself, or the node at which the data record was first received, the electronic order message is re-sent over the ring to the next node on the ring. If a node detects that a received electronic order message identifies the next node in the ring as being the node at which the current data record was first presented, then the node making such detection generates an order directive, including the original time-stamp, the receipt node identifier, and the assigned ordering identifier, while omitting the data record contents. The order directive is then transmitted over the ring to the next node on the ring, corresponding to the node at which the data record was first received. The order directive continues to be transmitted over the ring until reaching the ordering device. Each node receiving the ordering directive has already stored the contents of the data record, as indexed by the time-stamp and initial receipt node. As each node receives the ordering directive, it locates the corresponding data record and indexes it according to its assigned order.

In some embodiments of the method, as the ordering device detects receipt of an order directive from the ring, the ordering device recognizes that all of the nodes on the ring now have stored the relevant data record in proper sequenced order. The ordering device then generates a commit message in response thereto, confirming the order identifier previously assigned to such data record. This commit message may be transmitted over the ring, from node to node. As each node receives the commit message, that node becomes authorized to permit access to the stored data record in accordance with its assigned order.

In various embodiments of the method, the ordering device detects that a newly-received electronic new record message has already circulated all the way around the ring before reaching the ordering device. The method may then include the step of creating, at the ordering device, an order directive corresponding to the electronic new record message, without the need to create an ordering message. The order directive includes the original time-stamp, the initial receipt node identifier, and the ordering identifier assigned by the ordering device to the corresponding data record, but omitting the data record itself, since all of the nodes already have stored a copy of the data record. The ordering device transmits the order directive over the ring to the next node on the ring, which notes the data record being referenced, and which also notes the assigned order identifier. The node updates its records to store the data record in the proper order, and re-transmits the order directive over the ring to the next node. Once again, when the ordering device receives back a copy of the order directive from the ring, it may generate a commit message in response thereto, confirming the order identifier previously assigned to the corresponding data record. The commit message is transmitted over the ring, node to node, thereby authorizing each electronic storage device on the ring which has received the commit message to permit access to the stored data record in accordance with its assigned order identifier.

BRIEF DESCRIPTION OF THE DRAWINGS

FIG. 3A represents an empty index table of the type maintained by the first ring node of the ring replication system shown in FIG. 2, before the process of storing data begins, for temporarily storing node and timing information for each message received around the ring.

FIG. 3B is a second empty index table of the type maintained by the first ring node of the ring replication system shown in FIG. 2, before the process of storing data begins, for storing an assigned order to each received message.

FIGS. 4A and 4B correspond to the index tables of FIGS. 3A and 3B, respectively, after a first data message is received at the first ring node.

FIGS. 5A and 5B correspond to the index tables of FIGS. 4A and 4B, respectively, after such first data message has circulated to an ordering-ring node, and the ordering ring node has assigned an order to such first message.

FIGS. 6A and 6B correspond to the index tables of FIGS. 5A and 5B, respectively, after the first ring node confirms to the ordering node that the assigned order has been received.

FIGS. 7A and 7B correspond to the index tables of FIGS. 6A and 6B, respectively, after a second data message is received at the first ring node, a third data message is received at the second ring node, and a fourth data message is received at the third ring node.

FIGS. 8A and 8B correspond to the index tables of FIGS. 7A and 7B after the first ring node learns that the fourth data message was received at the third ring node at the same time that the second data message was received at the first ring node.

FIGS. 9A and 9B correspond to the index tables of FIGS. 8A and 8B after the first ring node learns that the third data message was received at the second ring node at the same time that the second and fourth data messages were received, and after receiving notice that the third data message has been assigned an order by the ordering-ring node.

FIGS. 10A and 10B correspond to the index tables of FIGS. 9A and 9B, respectively, after the first ring node receives notice that the ordering node has assigned an order to the third data message.

FIGS. 11A and 11B correspond to the index tables of FIGS. 10A and 10B, respectively, after the first ring node receives notice that the ordering node has assigned an order to the fourth data message.

FIGS. 12A and 12B correspond to the index tables of FIGS. 11A and 11B, respectively, after the first ring node receives notice that the ordering information for the second data message has been circulated around the ring.

FIGS. 13A and 13B correspond to the index tables of FIGS. 12A and 12B, respectively, after the first ring node receives notice that the ordering information for the third data message has been circulated around the ring.

FIGS. 14A and 14B correspond to the index tables of FIGS. 13A and 13B, respectively after the first ring node receives notice that the ordering information for the fourth data message has been circulated around the ring.

DETAILED DESCRIPTION

Figure 1:
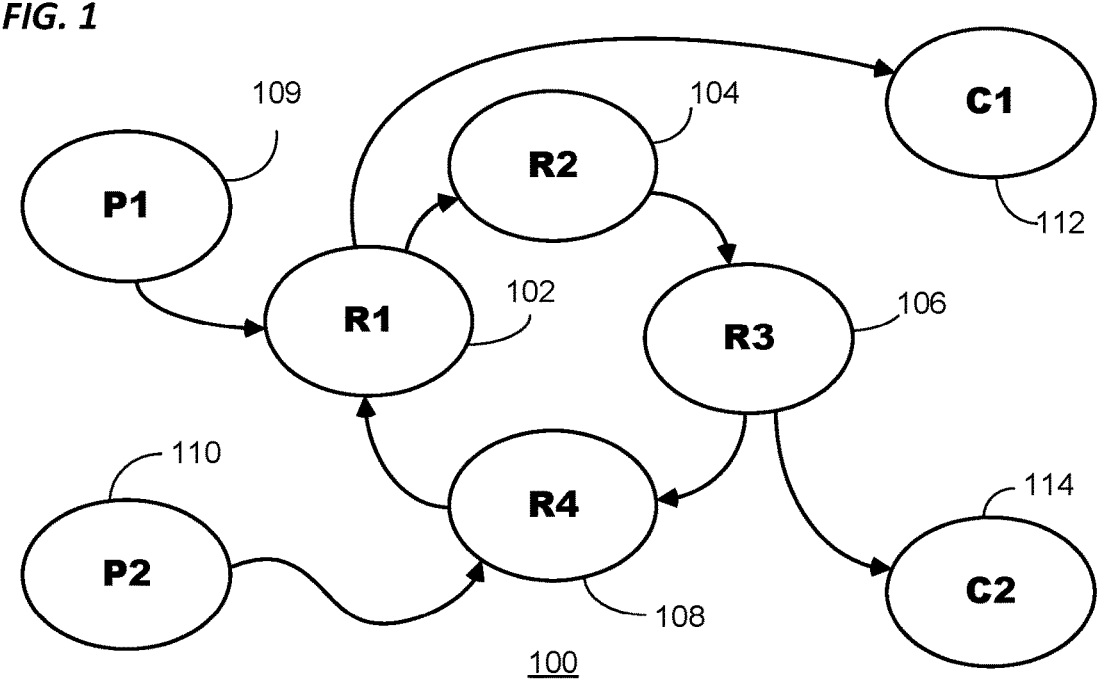
FIG. 1 is a flow diagram showing a four-node ring replication system, and including two source-data input nodes and two output nodes in accordance with one embodiment of the present invention.

Referring to FIG. 1, one embodiment of a ring replication system is shown in accordance with one embodiment of the present invention. Ring replication system 100 includes a central ring of four electronic storage devices R1 (node 102), R2 (node 104), R3 (node 106), and R4 (node 108). Ring nodes 102, 104, 106 and 108 serve as memory devices for receiving, storing, and providing electronic data. Such memory devices might include volatile memory, non-volatile memory, random access memory (RAM), dynamic random access memory (DRAM), static random access memory (SRAM), magnetic media, hard drives, flash memory, solid state drives (SSD), and/or other devices configured for electronically storing analog or digital information, such as in a database. Ring nodes 102, 104, 106 and 108 may also be digital computers which include one or more of the aforementioned types of storage devices, and which are either directly coupled to each other or networked together.

As shown in FIG. 1, node 102 can send data and/or control messages to node 104. Node 104 can send data and/or control messages to node 106. Node 106 can send data and/or control messages to node 108; and node 108 can send data and/or control messages to node 102. The ring replication system of FIG. 1 is redundant, and stores four copies of each data record, i.e., one copy of the data record is stored in each of ring nodes 102, 104, 106 and 108. Clearly, the number of ring nodes may be increased, if desired, for increased reliability. The number of ring nodes may also be reduced, with two ring nodes being the lower limit.

Also shown in FIG. 1 are data producing nodes 109 (P1) and 110 (P2). Producing nodes P1 and P2 supply data, e.g., high-speed streaming data from an external source, to various nodes on the ring replication system. For example, producing node 109 (P1) is shown as supplying data records to node 102 (R1), and producing node 110 (P2) is shown as supplying data records to node 108 (R4).

FIG. 1 also illustrates two consuming nodes, namely, node 112 (C1) and node 114 (C2). Consuming nodes request access to data records stored within the ring replication system. For example, consuming node 112 (C1) can request access to data records stored in ring node 102 (R1), and consuming node 114 (C2) can request access to data records stored in ring node 106 (R3). While producing nodes and consuming nodes are illustrated as separate nodes, it should be understood that a producing node and a consuming node may be combined together to form a bi-directional path between the ring replication system and the outside world.

Figure 2:
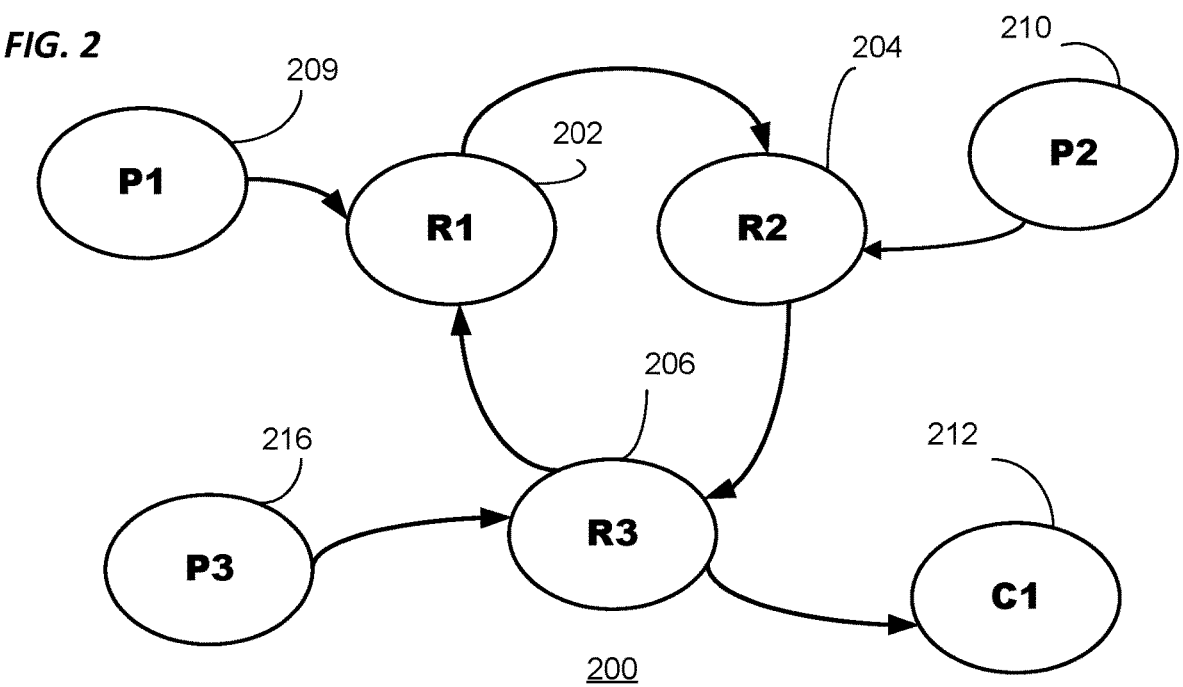
FIG. 2 is a flow diagram for a simplified three-node ring replication system, including three source data input nodes and one output node in accordance with another embodiment of the present invention.

To better explain the operation of the ring replication system, a simplified ring replication system 200 is illustrated in FIG. 2. Three ring nodes 202 (R1), 204 (R2), and 206 (R3) are configured to circulate data records and control messages around the ring. The directional arrows from R1 to R2, from R2 to R3, and from R3 to R1, indicate the direction of information flow in the system. Producing node 209 (P1) supplies a first incoming data string to ring node 202 (R1); producing node 210 (P2) supplies a second incoming data stream to ring node 204 (R2); and producing node 216 (P3) supplies a third incoming data stream to ring node 206 (R3). In the example of FIG. 2, only a single consuming node 212 (C1 is illustrated for simplicity.

Still referring to FIG. 2, information in ring replication system 200 is sent in the form of messages. Each message contains one or more bytes of information and can only travel across one of the arrows depicted in FIG. 2. The purpose of the ring replication system of FIG. 2 is to allow producer nodes (P) to send messages to consumer nodes (C), while replicating a copy of each message on each of the ring nodes (R). In addition, the following requirements should also be guaranteed:

1) All messages sent from a P node to an R node shall maintain the order of transmission;
2) All messages sent from an R node to a C node shall maintain the order of transmission;
3) Any R node sending messages to a C node shall do so in the same order as any other R node would have sent the same messages to any other C node (i.e., preserving the order of transmission);

4) Any messages sent from a P node to an R node, but lost during transmission due to any failure in the system, shall either be recovered from a different R node or not recovered at all.

Those skilled in the art will come to appreciate that while each ring node includes a digital time clock for allowing events to be time-stamped, accurate time synchronization is not required or expected as between any two ring nodes.

With the above goals in mind, each of the ring nodes R1 (202), R2 (204) and R3 (206) includes an internal digital clock; when a new data record is received by R1 node 202 from P1 producing node 209, is marked with a time-stamp (t) based on the digital clock of R1 node 202. This timestamp guarantees the relative order of receipt of data records received by R1 node 202. R1 node 202 also marks such data record with a receipt node identifier (u) unique to R1 node 202. For example, within a networked ring of nodes, the TCP/IP network address of node R1 node 202 can serve as a unique identifier of R1 node 202. Likewise, R2 node 204 applies a time-stamp (t) based on the digital clock of R2 node 204 to each data record that it receives from P2 producing node 210. This timestamp guarantees the relative order of receipt of data records received by R2 node 204. Also, R2 node 204 also marks such data record with a receipt node identifier (u) unique to R2 node 204. Similarly, data records received by R3 node 206 from P3 producing node 216 are stamped with the time of receipt (t) and a node identifier (u) unique to R3 node 206.

One of the ring nodes is initially designated as the ordering device, or ordering node. Any one of the ring nodes may serve as the ordering node, but once a particular ring node is designated as the ordering node, it retains such designation as long as that node remains operational. As will be shown below, the ordering node ultimately determines the absolute order of all of the stored data records, irrespective of which ring node first received such data record. In the example shown in FIG. 2, it will be assumed that R2 node 204 has been designated as the ordering node.

To make ring 200 operate properly and efficiently, a series of four protocol messages, or control messages, are exchanged along ring 200 from one R node to another: These four control messages are as follows:

1) New Message—a new record message, represented by NM[m,t,u], denotes a new message (m) received at time (t) by ring node (u);
2) Ordering Message—an ordering message, represented by OM[m,t,u,o], denotes an ordered message (m) received at time (t) by node (u), and having order (o) assigned by the ordering node;
3) Order Directive—an order directive, represented by ORD[t,u,o], denotes an assigned order designation, of order (o), to a message that has already been stored by each of the rings in the node, which arrived at time (t) at node (u). The contents of the message, or data record, itself need not be included because it has already been circulated around ring 200 and stored in each of the ring nodes;
4) Commit Message—a control message, represented by CMT[o], denotes a commitment/confirmation that the data record stored at order (o) is now authorized to be accessed by users.

Referring now to FIGS. 3A and 3B, each ring node in ring 200 maintains two tables, namely, a Time/Node table of data records, or messages, indexed by time-stamp and receipt node [t,u,] as shown in FIG. 3A, and a queue of ordered data records/messages, ordered by order (o) shown in FIG. 3B. As shown in FIGS. 3A and 3B, both tables are initially empty.

The protocol used to manage, store, and circulate incoming data records around ring 200 will now be described with the assistance of FIGS. 3A to 14B.

As a first rule, when a new data record/message (m) arrives at any ring node (u) from a producing node P coupled thereto, the received data record is assigned a receipt time (t), and is internally stored in the Time/Node table indexed by [t,u]. FIG. 4A shows an example wherein R1 ring node 202 receives a data record A at time 0:00:01 from P1 producing node 209. At this initial stage, data record A has not yet been assigned a formal order (o), so the ordered message table of FIG. 4B is still empty. R1 ring node 202 then sends a new record message NM[m,t,u] to R2 ring node 204, which is the next R node in ring 200, and which is also the designated ordering node. This message will advise R2 ring node 204 that R1 ring node 202 received a new data record with a time-stamp of 0:00:01, along with the actual contents of such data record.

When the new record message NM[m,t,u] arrives at R2 ring node 204, the Time/Node table maintained by R2 ring node 204 is updated to store the new data record indexed by [t, u]. Thus, the Time/Node table at R2 ring node 204 is updated to be identical to the Time/Node table shown in FIG. 4A for R1 ring node 202. Since the new record message NM[m,t,u] has now reached the designated ordering node R2, the ordering node assigns an order number (o) to the new data record A received from R1 ring node 202. These assigned order numbers monotonically increase each time a new order number is assigned. For example, if the ordering node assigned the immediately prior data record with order number x, then the ordering node causes the next new data record to be assigned an order number of x+1. In our example, it is assumed that data record A is the first data record/message processed by the ordering node, so the order assigned to data record A is "1". Ordering node R2 stores a copy of the data record A in its ordered message table along with the assigned order; at this stage, the ordered message table for R2 ring node 204 resembles FIG. 5B. However, ring node R1 is not yet aware of such order assignment, so the Time/Node table and ordered message table maintained by R1 ring node 202 still resemble those shown in FIGS. 4A and 4B. R3 ring node 206 is not yet aware that a new data record was received by ring node R1, so the Time/Node table and ordered message table maintained by R3 ring node 206 are still empty (as per FIGS. 3A and 3B).

Next, ordering node R2 sends out an ordering message OM[m,t,u,o] to the next R node in ring 200, which in this case is R3 ring node 206. The ordering message OM[m,t,u,o] presents R3 ring node 206 with new data record A, its time-stamp (t) index and receipt node (u) index, as well as its newly-assigned order (o). R3 ring node 206 updates its Time/Node Table to temporarily store data record A indexed by time-stamp (t) and receipt node (u), as per FIG. 4A. R3 ring node 206 also updates its ordered message table to store data record A at assigned order position (o), as per FIG. 5B.

R3 ring node 206 may detect from the received ordering message OM[m,t,u,o] that the new data record was initially received at R1 ring node 202, which happens to be the next ring node on ring 200; i.e., next node R1 in ring 200 is the same node at which data record A was first received from producing node P1 There is no need to further transmit the contents of data record A on ring 200 since all of the ring nodes on ring 200 have now stored a copy of data record A. Accordingly, R3 ring node issues an order directive ORD

[t,u,o] onto ring 200 for transmission to R1 ring node 202. Upon receiving the order directive message ORD[t,u,o], R1 ring node 202 locates the data record A temporarily stored in its Time/Node table indexed by time-stamp (t) and receipt node (u) (see FIG. 4A) and stores data record A in its ordered message table at order position 1, as represented by FIG. 5B. R1 ring node 202 then re-transmits order directive ORD[t, u,o] onto ring 200 for transmission to R2 ring node 204 (the ordering node). R1 Ring node 202 may then nullify, or remove, record A from its Time/Node table, as is represented in FIG. 5A.

When R2 ring node 204 (the ordering node) receives the order directive ORD[t,u,o] from R1 ring node 202, then the ordering node is thereby notified that every R ring node in ring 200 has been advised of the order assigned to data record A. At this stage, R2 ring node 206 may advise the other ring nodes R3 and R1 that data record A is ready to be shared with users who wish to access such data record. To this end, R2 ordering node 206 issues a commit message CMT[o] and transmits it to the next R node in the ring, i.e., R3 ring node 206. Upon receiving commit message CMT [o], R3 ring node 206 updates its ordered message table to authorize access by users/consumers, as indicated symbolically by the checkmarks added in FIG. 6B. R3 ring node 206 is aware that the next node in ring 200, namely R1 ring node 202, is not the designated ordering node; accordingly, R3 ring node 206 re-transmits message CMT[o] onto ring 200 to R1 ring node 202. Upon receipt of commit message CMT[o], R1 ring node 202 updates its ordered message table to authorize access by users/consumers, as indicated symbolically by the checkmarks added in FIG. 6B. Lastly, R1 ring node 202 may re-transmit the commit message CMT[o] to the next ring node in ring 200, namely ordering node R2. Ordering node R2 thereby receives confirmation that all of the R ring nodes on the ring have received authorization to make data record A accessible to users, and no further management of data record A is required.

Continuing the description of ring 200 in FIG. 2, it will now be assumed that three new data records B, C, and D are produced by producing nodes P1, P2, and P3 to ring nodes R1, R2, and R3, respectively, all being received concurrently at clock time 0:00:02. In order to process the three new messages, several cycles of information exchanges must take place around ring 200.

During the first cycle, R1 node 202 receives data record B at time 0:00:02, and in response, generates a new data record message NM["B", 0:00:02, R1], for transmission to R2 ring node 204 (the ordering node). R1 node 202 also updates its Time/Node table to temporarily store the information in such new data record message, as per FIG. 7A. R1 node 202 does not yet know what order will be assigned to data record B, so the ordered message table maintained by R1 node 202 still resembles FIG. 7B.

Also during this first cycle, ordering node R2 has just received its own new data record C from producing node P2 at clock time 0:00:02. This new data record C is only the second data record seen by R2 ordering node 204 thus far, so R2 ordering node 204 assigns an order of 2 to new data record C. To inform the other ring nodes of new data record C and its assigned order of 2, the R2 ordering node issues ordering message OM["C", 0:00:02, R2, 2] and transmits it over ring 200 to R3 ring node 206. R2 ordering node stores data record C in its ordered message table at order position 2, as per FIG. 9B.

Also during this first cycle, R3 ring node 206 has just received new data record D from producing node P3 at clock time 0:00:02. R3 node 206 stores new data record D in its Time/Node table indexed by time (t=0:00:02) and receipt node (u=R3). R3 node 206 also generates a new data record message NM["D", 0:00:02, R3], and transmits it over ring 200 to R1 node 202. R3 node 206 also updates its Time/ Node table to temporarily store data record D indexed by time (t=0:00:02) and receipt node (u=R3). R3 node 206 does not yet know what order will be assigned to data record D, so the ordered message table maintained by R3 node 206 still resembles FIG. 7B.

During the next cycle, or second cycle, the R1 node 202 receives new data record message NM["D", 0:00:02, R3] from R3 ring node 206. Accordingly, R1 node 202 updates its Time/Node table to temporarily store data record D received at R3 node 206, as per FIG. 8A. R1 node 202 still lacks ordering information for either messages B or D, so the ordered message table maintained by R1 ring node 202 still resembles FIG. 8B. Finally, R1 node 202 re-transmits new data record message NM["D", 0:00:02, R3] to R2 ordering node 204.

Also during this second cycle, upon receiving new data record message NM["B", 0:00:02, R1] from R1 node 202, ordering node 204 now assigns order 3 to new data record B received at R1 node 202, and stores a copy of new data record B at position 3 in its ordered message table, as per FIG. 10B. The R2 ordering node 204 also generates an ordering message OM["B",0:00:02,R1,3] for transmission on ring 200 to R3 node 206, including a copy of data record B and its assigned order 3.

Also during this second cycle, R3 node 206 receives ordering message OM["C", 0:00:02, R2, 2] from R2 node 204; in response, R3 node 206 updates its ordered message table to store a copy of data record C at position 2, as per FIG. 9B. R3 node 206 also re-transmits ordering message OM["C", 0:00:02, R2, 2] onto ring 200 to R1 node 202.

During the next, or third, cycle of information transfer along ring 200, the R1 node 202 receives ordering message OM["C", 0:00:02, R2, 2] from R3 node 206; in response, R1 node 202 updates its ordered message table to store data record C at position 2, as per FIG. 9B. R1 node 202 also issues an order directive ORD[0:00:02,R2,2] and transmits it over ring 200 to ordering node R2; ordering node R2 already has a stored copy of data record C and does not need to receive another copy. Also during this third cycle, R2 ordering node 204 receives the new data record message NM["D", 0:00:02, R3] from R1 node 202. All ring nodes now have a stored copy of data record D. Data record D is the fourth data record to be processed by ordering node R2, and ordering node R2 assigns an order of 4 to data record D. R2 ordering node 204 stores a copy of data record D at position 4 in its ordered message table, as per FIG. 11B. Ordering node R2 also issues an order directive ORD[0:00: 02,R3,4] for transmission to R3 node ring 206 to advise that order 4 has been assigned to data record D. Also during this third cycle, R3 ring node 206 receives ordering message OM["B",0:00:02,R1,3] and stores data record B in its ordered message table at position 3, as per FIG. 10B. Also, R3 ring node 206 transmits an ordering directive message ORD[0:00:02,R1,3] to R1 ring node 202 to advise that data record B, which is already stored in R1 ring node 202, has been assigned order 3.

Upon the next, or fourth, cycle of information transfer along ring 200, R1 node ring 202 receives ordering directive message ORD[0:00:02,R1,3]; in response, R1 node ring 202 stores a copy of data record B at position 3 in its ordered messages list. R1 node ring 202 also re-transmits ordering directive message ORD[0:00:02,R1,3] to order node R2. Also during this fourth cycle, ordering node R2 receives order directive ORD[0:00:02,R2,2] from R1 ring node 202; in response, ordering node R2 issues a commit message CMT[2] for transmission over ring node 200 to confirm that all nodes on ring 200 have attributed data record C with order 2. The ordered message table for R2 ring node 204 now appears as in FIG. 12B, with both data records A and C having checkmarks indicating that data records A and C are both properly stored and ready for user access. Also during the fourth cycle, R3 node 206 receives order directive ORD[0:00:02,R3,4] from R2 node 204, and in response, R3 node 206 stores a copy of data record D at position 4 in its ordered message table, as per FIG. 11B. Also, R3 node 206 re-transmits order directive ORD[0:00:02,R3,4] over ring 200 to R1 ring node 202.

Upon the next, or fifth, cycle of information transfer along ring 200, R1 ring node 202 receives order directive ORD [0:00:02,R3,4]; in response, R1 ring node 202 stores a copy of data record D in the fourth position of its ordered message list, as per FIG. 11B. In addition, R1 ring node 202 re-transmits order directive ORD[0:00:02,R3,4] over ring 200 to R2 ring node 204. Also during this fifth cycle, R2 ring node 204 receives ordering directive message ORD[0:00: 02,R1,3]; in response, ordering node R2 issues a commit message CMT[3] for transmission over ring node 200 to confirm that all nodes on ring 200 have attributed data record B with order 3. At this point, the ordered message table for R2 ring node 204 is updated to appear as in FIG. 13B, with data records A, C and B all having checkmarks indicating that data records A, C and B are properly stored/ordered and ready for user access. During this fifth cycle, R3 node 206 receives commit message CMT[2], which confirms to R3 node 206 that all nodes in ring 200 have now ordered data record C with order 2, and R3 node 206 is now authorized to permit users to access data record C. R3 node 206 re-transmits commit message CMT[2] over ring 200 to R1 ring node 202 to advise it as well.

Upon the next, or sixth, cycle of information transfer along ring 200, R1 ring node 202 receives commit message CMT[2]; in response, R1 ring node 202 updates its ordered message table to reflect that the proper order for data records A and C has been stored in all rings on the node, and R1 ring node 202 is authorized to permit user access to data records A and C. R1 ring node 202 need not re-transmit commit message CMT[2] back to ordering node R2. Also during the sixth cycle, R2 ring node receives order directive ORD[0: 00:02,R3,4]; in response, R2 ring node 204 issues commit message CMT[4] and transmits it to R3 ring node 206 to indicate that all nodes on ring 200 have now properly stored data record D at order 4. The ordered message table for R2 ring node 204 is updated to appear as in FIG. 14B, with all four data records A, C, B and D having a checkmark indicating that they may now be accessed by users, and that they are stored in the proper order in every node on the ring. Also, during the sixth cycle, R3 node 206 receives commit message CMT[3]; in response, R3 ring node 206 updates its ordered message table, as per FIG. 13B, to reflect that the proper order for data records A, C and B has been stored in all rings on the node, and R3 ring node 206 is authorized to permit user access to data records A, C and B. R3 ring node 206 also re-transmits commit message CMT[3] to R1 node 202.

Two more cycles of information transfer are still needed to complete the process. During the seventh cycle, R3 node 206 receives commit message CMT[4], and re-transmits it to R1 node 202. By the end of the seventh cycle, R3 node 206 has updated its ordered message table to appear as shown in FIG. 14B. Also during the seventh cycle, R1 node 202 receives commit message CMT[3]; by the end of the seventh cycle, the ordered message table for R1 node 202 appears as in FIG. 13B.

Finally, during the eighth cycle of information transfer, R1 node 202 receives commit message CMT[4], and updates its ordered message table to appear as in FIG. 14B. At this stage, all nodes on the ring are authorized to share ordered data records A, C, B and D with users.

Figure 15:
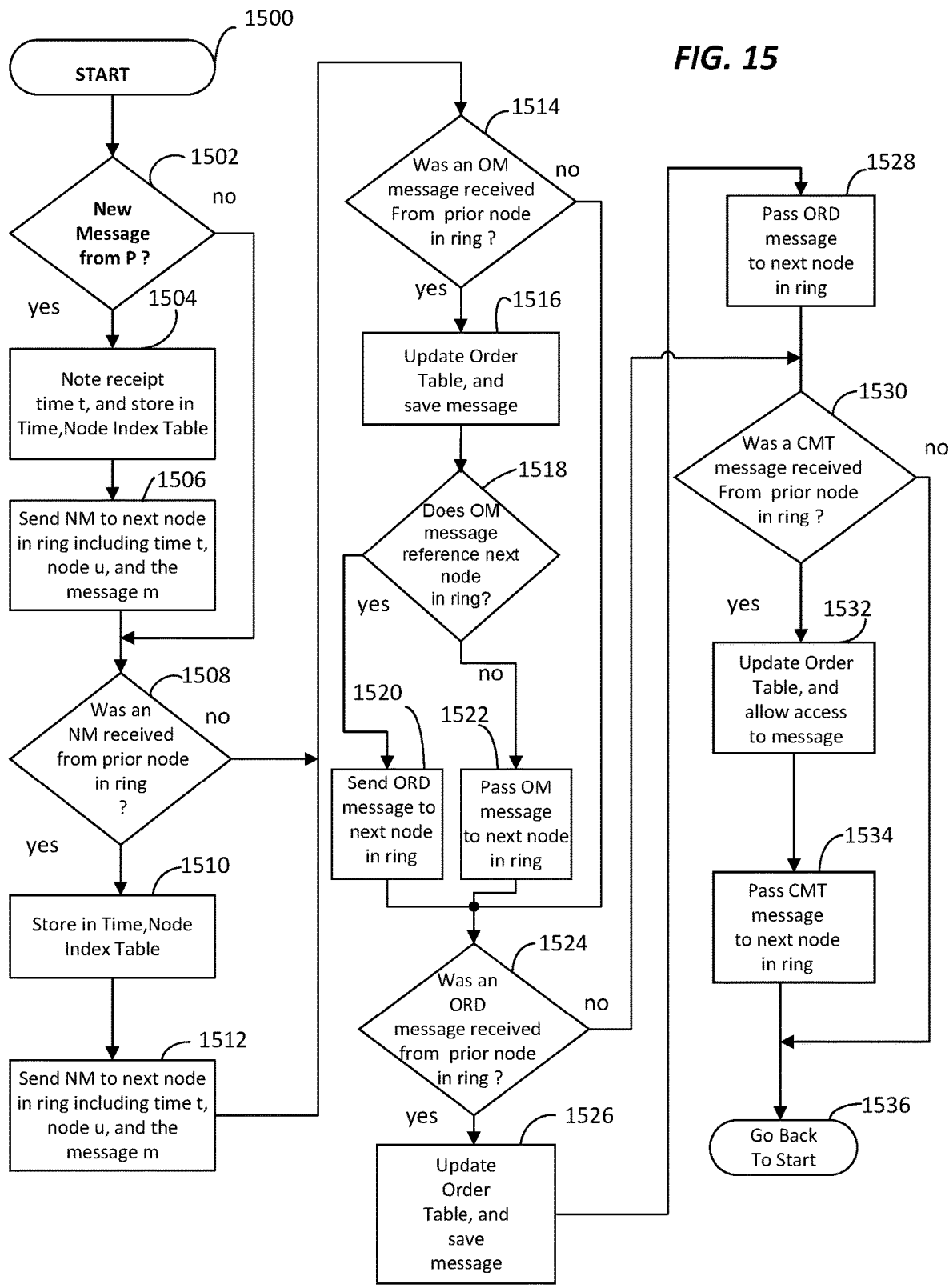
FIG. 15 is a flowchart showing processing steps performed by each ring node that is not the designated ordering node.

FIG. 15 is a flowchart diagram illustrating the processing steps performed at each ring node, apart from the ring node that has been designated as the ordering node. In FIG. 15, flow begins at Start block 1500 and proceeds to diamond-shaped decision box 1502 to determine whether a new data record has been received from an attached producing node P. For example, referring to FIG. 2, ring node R1 checks to see if producing node P1 has presented a new data record. If so, then flow passes to box 1504 for noting and storing the new data record m temporarily indexed by receipt time t and originating node u. Flow passes to box 1506 for sending a new record message NM to the next node in the ring to alert the other nodes in the ring of the newly-received message from that attached producing node. If the attached producing node has not presented a new data record, then flow bypasses boxes 1504 and 1506.

At diamond decision box 1508, the ring node checks to see whether it has received a new record message from its upstream neighboring ring node. If so, flow passes to box 1510 for temporarily storing the new data record indexed by receipt time t and initial receiving node u. Then, at box 1512, a new record message NM is re-transmitted to the next downstream ring node. If no new record message NM is received from its upstream neighbor, flow bypasses blocks 1510 and 1512.

Still referring to FIG. 15, control then passes to diamond-shaped decision block 1514 to determine whether a new ordering message OM has been received from its upstream neighbor. If so, then at block 1516, the ring node updates its ordered message table to store the applicable data record at the appropriate ordered position o. Flow then passes to diamond-shaped decision box 1518 where it is determined whether the received ordered message OM refers to the next node in the ring as having been the receiving node. If the ordering message OM indicates that the data record included in the current ordering message OM was first received at the ring node that is the next node in the ring, then the OM message will not be re-transmitted, and instead, an ORD ordering directive will be sent; box 1520 generates and sends the ORD ordering directive message specifying indexes t and u, along with the assigned order o. On the other hand, if the ordering message OM indicates that the data record included in the current ordering message OM was not first received at the ring node that is the next node in the ring, then the OM message is re-transmitted to the next node in the ring, as indicated by block 1522. Finally, if no OM message was received, then blocks 1516, 1518, 1520 and 1522 are bypassed.

Control now passes to diamond-shaped decision box 1524 to determine whether an ordering directive ORD message was received from the upstream neighboring ring node. If so, then, at step 1526, the node ring updates its ordered message listing table to save the referenced data record at position o, and at step 1528, the ORD message is re-transmitted to the next node in the ring. If no ORD message was received, then blocks 1526 and 1528 are bypassed.

Still referring to FIG. 15, control passes to diamond-shaped decision block 1530 to determine whether the ring node has received a CMT commit message from its neighboring ring node upstream. If so, then at block 1532, the ordered message list table is updated to authorize access to the corresponding data record. Control then flows to block 1534 to re-transmit the CMT message to the next ring node downstream. If no CMT message was received, then steps 1532 and 1534 are bypassed. At this stage, the ring node has performed all of its required operations, and at step 1536, control is passed back to Start block 1500 in preparation for the next cycle.

Figure 16:
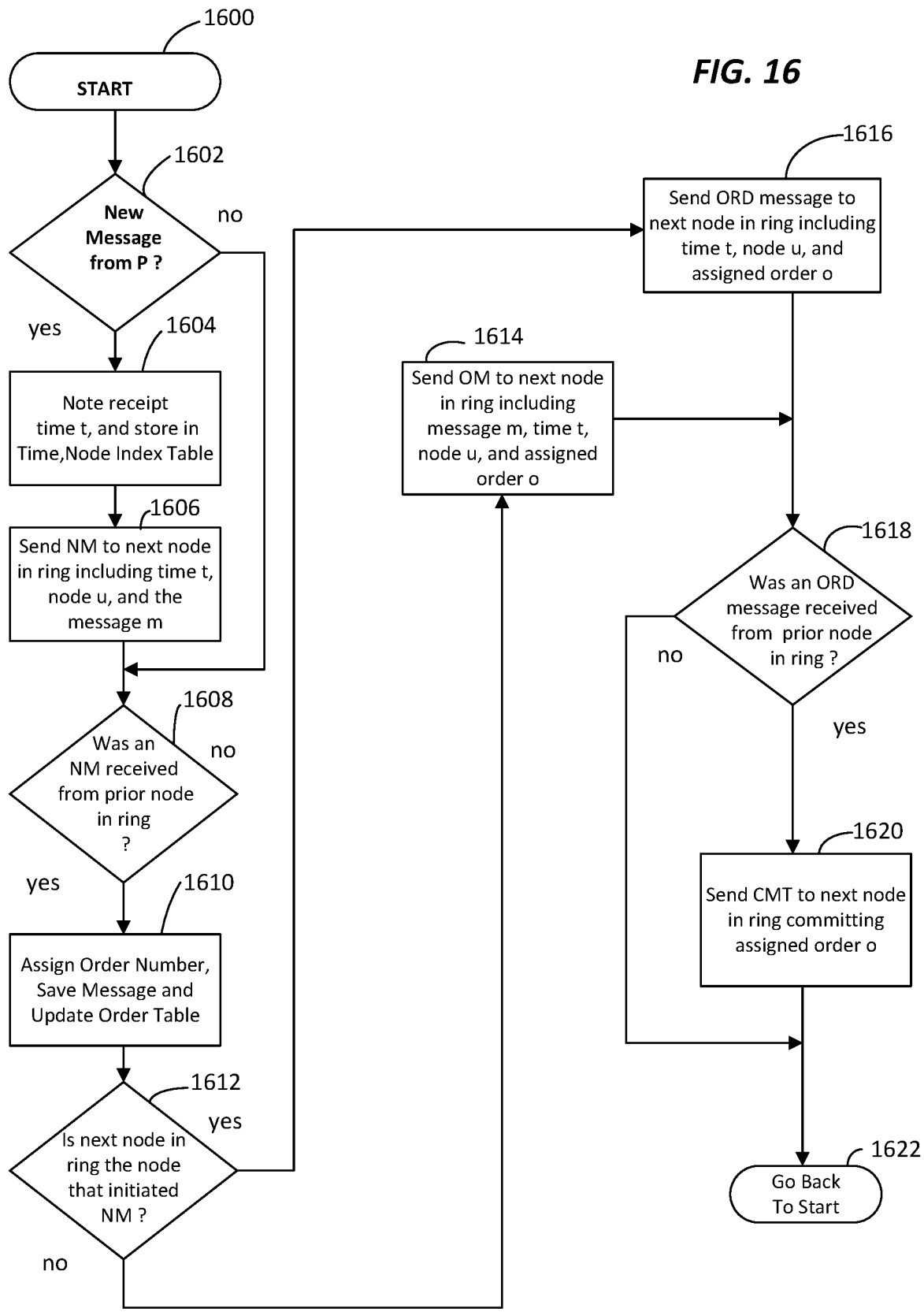
FIG. 16 is a similar flowchart but showing the processing steps performed by the ring node that has been designated as the ordering node.

FIG. 16 provides a similar flowchart diagram illustrating the steps performed by the particular ring node that has been designated as the ordering node. Control starts at Start block 1600 and passes to diamond-shaped decision block 1602 for checking to see whether an attached producing node P has provided a new data record. If so, then flow passes to box 1604 for noting and storing the new data record m temporarily indexed by receipt time t and originating node u. Flow passes to box 1606 for sending a new record message NM to the next node in the ring to alert the other nodes in the ring of the newly-received message from that attached producing node. If the attached producing node has not presented a new data record, then flow bypasses boxes 1604 and 1606.

At diamond decision box 1608, the ring node checks to see whether it has received a new record message from its upstream neighboring ring node. If so, flow passes to box 1610 for storing the new data record in its ordered message list table at the next available position (order o) which corresponds to the order o assigned to the new data record. Control then passes to diamond-shaped decision box 1612 to determine whether the received new record message NM refers to the next node in the ring as having been the receiving node u. If the new record message NM indicates that the data record included in the current new record message NM was first received at the ring node that is the next node in the ring, then flow passes to block 1616 to generate an ORD ordering directive for transmission to the next node in the ring. Alternatively, if the new record message NM indicates that the data record included in the current new record message NM was not first received at the ring node that is the next node in the ring, then control passes to block 1614 to send an ordering message OM to the next ring node, providing the data record m, time stamp t, receipt node u, and the order o assigned by the ordering node. After processing the steps of either block 1616 or block 1614, flow then passes to diamond-shaped decision box 1618 to determine whether an ORD ordering directive message was received from the neighboring ring node upstream. If so, then flow passes to block 1620 for transmitting a CMT commit message to the next node in the ring to inform it that all nodes in the ring have acknowledged that the date record stored at order o has been properly ordered, and user access may now be permitted to such data record. On the other hand, if no ORD message was received from the prior ring node, then block 1620 is bypassed, and flow passes to End block 1622 for starting the next cycle back at Start block 1600.

Those skilled in the art will appreciate from the above description that the ring replication system and method achieves the following aims:

1) each new data record arriving at any R node on ring 200 will be transmitted to every other R node exactly once;
2) each R node on ring 200 will send each received data record exactly once to any other R node on ring 200;
3) when each data record arrives at the ordering node in ring 200, the ordering node assigns a unique order to such data record;
4) once a data record has been assigned an order by the ordering node, the assigned order will propagate to all other ring nodes on ring 200; and
5) only after the assigned order of a data record has been received by all ring nodes, will such data record be accessible by consumers, in accordance with its assigned order relative to all other stored data records.

If any ring node R (apart from the designated ordering node) is taken out of the ring, for example due to a failure of such node), the operation of the ring may be continued. The only adjustment which must be made is to advise the ring node directly upstream from the failed ring node to bypass the failed node in favor of the next ring node. Thus, in the case of the four node ring shown in FIG. 1, let it be assumed that the R4 node 108 is the designated ordering node, and let it also be assumed that the R2 node experiences a failure. In that case, it is only necessary to update the R1 node to send its data records and related control messages to node R3 rather than to node R2. While there will one fewer node having a reliable copy of the stored data, the ring can continue to operate until necessary repairs are made.

On the other hand, if it is the designated ordering node which fails, then the ring node which is next in line, i.e., immediately downstream from the failed node, can automatically be designated as the successor ordering node (OR), and the operation of the ring may continue quickly after such failure is experienced. The initial selection of the ordering node is rather arbitrary, since each of the ring nodes is capable of being designated as the ordering node.

Additional variations and optimizations may be implemented without diverging from the described principles of the disclosed embodiments. One such modifications may include, for example, compressing the transmitted data to take up less storage space, and then expanding such data when accessed by a user. Another such modification relates to sending fewer than a complete set of commit (CMT) messages compared with the number of data records being circulated around the ring. This modification can be practiced because the order in CMT messages is monotonically increasing. Thus, for any numbers (x) and (y), where (x)>(y), CMT[(x)] implies CMT[(y)]. Therefore, circulation of commit message CMT[(x)] may be omitted from the protocol if CMT[(y)] will be sent within some short time interval thereafter. Other simplifications may be made in the case where the ring includes only two nodes. Also, CMT (commit) messages may be sent periodically, rather than for every message, if desired. In addition, while the description above uses the ordering node to issue CMT messages, one could also use the ring node located immediately upstream from the ordering node to issue such CMT messages, thereby eliminating one message from each cycle.

Those skilled in the art will note that each data record is received exactly once by each ring node. It will also be noted that CMT (commit) messages are issued and received in ascending order (CMT[1], CMT[2], CMT[3], CMT[4]). Moreover, the amount of data sent and received by any node closely follows the actual amount of data in messages, with little overhead per message, making the information transfer highly efficient.

The disclosed ring replication system allows any node in the ring to serve as both a data ingestion point for producers, and as a data access point for consumers, thus significantly improving the scalability of a system, as compared to a chain replication system, wherein only one node can communicate with consumers and producers, while other nodes serve only for storage purposes.

The disclosed ring replication system also guarantees against data loss of stored data in the event of network or machine failure.

While several embodiments are illustrated and/or described herein, it will be appreciated that such disclosed embodiments are merely illustrative of the present invention, and that modifications and variations may be made to such embodiments without departing from the spirit and intended scope of the present invention. Hence, these descriptions and drawings should not be considered in a limiting sense, as it is understood that the present invention is in no way limited to only the embodiments illustrated.

We claim:

1. An apparatus for receiving and storing electronic data, and for providing access to stored electronic data, comprising in combination:
   a first electronic storage device including hardware memory;
   a second electronic storage device including hardware memory, the second electronic storage device being coupled to the first electronic storage device and being configured to receive a digital data record stored in the first electronic storage device;
   the first electronic storage device being configured to receive a digital data record stored in the second electronic storage device;
   a streamed digital data receiver configured to receive a sequenced stream of digital data records, the streamed digital data receiver being coupled to one of the first and second electronic storage devices for providing the sequenced stream of the digital data records thereto for storage;
   the second electronic storage device being a computing device comprising a hardware memory, the computing device configured for associating an ordering identifier with each digital data record of the sequenced stream being stored at each of the first electronic storage device and the second electronic storage device, and storing the ordering identifier in association with each digital data record of the sequenced stream stored at each of the first electronic storage device and the second electronic storage device, the ordering identifier specifying an order in which each digital data record of the sequenced stream is received at any of the first electronic storage device or second electronic storage device;
   the computing device being configured to provide, to the first electronic storage device and the second electronic storage device, the ordering identifier associated with a particular digital data record of the sequenced stream;
   wherein the particular digital data record is circulated between the first electronic storage device and the second electronic storage device, and wherein each of the first electronic storage device and the second electronic storage device, based on receiving the ordering identifier and the particular data record, is configured to store the particular digital data record in an ordered list of the digital data records of the sequenced stream at a position in the ordered list specified by the ordering identifier;
   the computing device, based on receiving, from the first electronic storage device, the particular digital data record that is already stored in the second electronic storage device, being configured to generate a commit message specifying that each of the first electronic storage device and the second electronic storage device are storing the ordered list of the digital data records including the particular digital data record at the position in the ordered list specified by the ordering identifier; and
   a remote computing device coupled to one of the first and second electronic storage devices for sequentially accessing, based on the commit message, the digital data records, of the sequenced stream, stored therein in accordance with the ordering identifiers associated with such digital data records.

2. The apparatus of claim 1, wherein the computing device is configured to confirm that the particular digital data record is redundantly stored in each of the first electronic storage device and the second electronic storage device; and
   wherein the remote computing device is configured to access the particular digital data record in response to confirmation by the computing device that the particular digital data record is redundantly stored in each of the first electronic storage device and the second electronic storage device.

3. An apparatus for receiving and storing data, and for providing access to stored data, comprising in combination:
   a first electronic storage device including hardware memory;
   a second electronic storage device including hardware memory, the second electronic storage device being coupled to the first electronic storage device and being configured to receive a digital data record stored in the first electronic storage device;
   a third electronic storage device including hardware memory, the third electronic storage device being coupled to the second electronic storage device and being configured to receive the digital data record stored in the second electronic storage device;
   the first electronic storage device being coupled to the third electronic storage device and being configured to receive the digital data record stored in the third electronic storage device, the first, second and third electronic storage devices being configured to form a ring configured for storing, on each of the first, second and third electronic data storage devices, an instance of the digital data record;
   a streamed digital data receiver configured to receive a sequenced stream of digital data records, the streamed digital data receiver being coupled to one of the first, second, and third electronic storage devices for providing the sequenced stream of the digital data records thereto for storage;
   one of the first, second, and third electronic storage devices being designated as a computing device, configured for associating an ordering identifier with each digital data record of the sequenced stream being stored at each of the first electronic storage device, the second electronic storage device and the third electronic storage device, and storing the ordering identifier in association with each digital data record of the sequenced stream that is stored at each of the first electronic storage device, the second electronic storage device and the third electronic storage device;
   the computing device being configured to provide, to another of the first, second, and third electronic storage devices, the ordering identifier associated with a particular digital data record, of the sequenced stream, stored in the computing device, the ordering identifier specifying an order in which each digital data record is received at any of the first, second, or third electronic storage devices;

wherein the particular digital data record is circulated among the first, second, and third electronic storage devices, and wherein each of the first, second, and third electronic storage devices, based on receiving the ordering identifier and the particular data record, is configured to store the particular digital data record in an ordered list of the digital data records of the sequenced stream at a position in the ordered list specified by the ordering identifier;

the computing device, based on receiving, from another one of the first, second, and third electronic storage devices that is not designated as the computing device, the particular digital data record that is already stored in the one of the first, second, and third electronic storage devices being designated as the computing device, being configured to generate a commit message specifying that each of the first, second, and third electronic storage devices are storing the ordered list of the digital data records including the particular digital data record at the position in the ordered list specified by the ordering identifier; and a remote computing device coupled to one of the first, second, and third electronic storage devices for sequentially accessing, based on the commit message, digital data records, of the sequenced stream, stored therein in accordance with the ordering identifiers associated with such digital data records.

4. The apparatus recited by claim 3 wherein each electronic storage device that receives a new data record from the streamed digital data receiver creates an electronic new record message for such received data record, the electronic new record message including a time of receipt, an identification of the electronic storage device to which such received data record was initially presented, and data record contents.

5. The apparatus recited by claim 4 wherein each electronic new record message created by an electronic storage device is transmitted to a next electronic storage device on the ring.

6. The apparatus recited by claim 5 wherein, upon receipt of an electronic new record message from the ring, the electronic storage device receiving the electronic new record message stores information within the electronic new record message, including the time of receipt, an identification of the electronic storage device to which such received data record was initially presented, and the data record contents.

7. The apparatus recited by claim 5 wherein, upon receipt of an electronic new record message from another electronic storage device on the ring, the computing device creates an electronic order message for such received data record, the electronic order message including the time of receipt, an identification of the electronic storage device to which such received data record was initially presented, the data record contents, and the ordering identifier associated with such message.

8. The apparatus recited by claim 7 wherein:
for each electronic storage device of the first, second, and third electronic storage devices, upon receiving an electronic order message sent by the computing device at that electronic storage device, that electronic storage device stores the data record contents of the electronic order message in the ordered list of data records at the position in the ordered list specified by the ordering identifier; and
unless the next electronic device in the ring is either the computing device or the electronic storage device at which a data record was first presented, the electronic order message is circulated to the next electronic storage device on the ring.

9. The apparatus recited by claim 8 wherein, upon an electronic storage device receiving an electronic order message identifying the next electronic storage device in the ring as the electronic storage device which first received the data record included in such electronic order message, the electronic storage device receiving such electronic order message generates an order directive including the time of receipt, the electronic storage device which initially received the data record, and the assigned ordering identifier, and transmits the order directive to the next electronic storage device on the ring.

10. The apparatus recited by claim 9 wherein:
an order directive is received by the computing device from the ring;
the computing device issues a commit message in response thereto, the commit message specifying the order identifier previously assigned to a data record;
the computing device transmits the commit message to the next electronic storage device on the ring; and
each electronic storage device on the ring which has received the commit message is authorized to permit access to the stored data record having the previously assigned order identifier.

11. The apparatus recited by claim 5 wherein:
an electronic storage device on the ring generates an electronic new record message;
the electronic new record message circulates entirely around the ring and reaches the computing device;
the computing device is located on the ring adjacent to the electronic storage device that generated the electronic new record message;
upon receipt of such electronic new record message, the computing device creates an order directive corresponding to the electronic new record message, the order directive including the time of receipt, an identification of the electronic storage device to which such received data record was initially presented, and the ordering identifier associated with such message; and
the computing device sends the order directive to the next electronic storage device on the ring.

12. The apparatus recited by claim 11 wherein:
an order directive is received by the computing device from the ring;
the computing device issues a commit message in response thereto, the commit message specifying the order identifier previously assigned to a data record;
the computing device transmits the commit message to the next electronic storage device on the ring; and
each electronic storage device on the ring which has received the commit message is authorized to permit access to the stored data record having the previously assigned order identifier.

13. A method for receiving and storing electronic data in a redundant manner, and for providing access to stored electronic data, comprising:
providing a first electronic storage device including hardware memory;
providing a second electronic storage device including hardware memory;
coupling the second electronic storage device to the first electronic storage device for allowing the second electronic storage device to receive a digital data record stored in the first electronic storage device;

providing a third electronic storage device including hardware memory;

coupling the third electronic storage device to the second electronic storage device for allowing the third electronic storage device to receive the digital data record stored in the second electronic storage device;

coupling the first electronic storage device to the third electronic storage device for allowing the first electronic storage device to receive the digital data record stored in the third electronic storage device, wherein the first, second and third electronic storage devices form a ring;

configuring at least one of the first, second, and third electronic storage devices to receive a sequenced stream of digital data records for storage from an external source;

configuring at least one of the first, second, and third electronic storage devices to transmit a sequenced stream of digital data records stored therein to a remote computing device after the digital data records of the sequence stream have been stored by the first, second and third electronic storage devices;

designating one of the first, second and third electronic storage devices as a computing device configured for associating an ordering identifier with each digital data record processed thereby and storing the ordering identifier in association with each digital data record, of the sequenced stream, stored at each of the first electronic storage device, the second electronic storage device, and the third electronic storage device, the ordering identifier specifying an order in which each digital data record of the sequenced stream is received at any of the first, second, or third electronic storage devices;

circulating each received digital data record of the sequenced stream to each of the first, second and third electronic devices and storing each received digital data record of the sequenced stream in each of the first, second and third electronic storage devices;

circulating the ordering identifier, associated by the computing device with each received digital data record of the sequenced stream, to each of the other electronic storage devices, whereby each of the first, second and third electronic storage devices associates the same ordering identifier with each corresponding digital data record stored at each of the first electronic storage device, the second electronic storage device, and the third electronic storage device;

confirming, by the designated computing device by receiving a particular data record from another of the first, second and third electronic storage devices, that the ordering identifier for the particular digital data record of the sequenced stream and the particular data record have been fully-circulated to each of the first, second and third electronic storage devices;

generating, by the designated computing device, a commit message that indicates that the ordering identifier for a particular digital data record of the sequenced stream and the particular data record have been fully-circulated to each of the first, second and third electronic storage devices; and allowing, based on the commit message, at least one of the first, second, and third electronic storage devices to transmit the sequenced stream of the digital data records stored therein to the remote computing device after the designated computing device confirms that each of digital data record of the sequenced stream and the associated ordering identifier have been circulated to each of the first, second and third electronic storage devices.

14. The method of claim 13 wherein configuring at least one of the first, second, and third electronic storage devices to receive the sequenced stream of digital data records for storage from an external source comprises:

maintaining a clock to keep time;

noting the time of the clock when a given digital data record of the sequenced stream is first received by one of the first, second and third electronic storage devices for storage;

creating an electronic storage device identifier to indicate which of the first, second and third electronic storage devices first received the given digital data record;

storing a time of receipt, the electronic storage device identifier, and the corresponding given digital data record in the electronic storage device that first received the given digital data record;

creating a new record message that includes the time of receipt, the electronic storage device identifier, and the corresponding given digital data record; and sending the new record message to a next electronic storage device on the ring.

15. The method of claim 14 comprising storing, upon receipt by an electronic storage device of an electronic new record message from the ring, the time of receipt, an identification of the electronic storage device to which such received data record was initially presented, and data record contents within the electronic storage device that received the electronic new record message from the ring.

16. The method of claim 14 wherein, upon receipt by the computing device of an electronic new record message from another electronic storage device on the ring:

the computing device creates an electronic order message including the time of receipt, an identification of the electronic storage device to which such received data record was initially presented, the data record contents, and the ordering identifier associated with such message; and the computing device circulates the electronic order message over the ring to the next electronic storage device on the ring.

17. The method of claim 16 wherein:

upon receiving an electronic order message sent by the computing device, each electronic storage device stores the data record contents of the electronic order message in an ordered list of data records at a position in the ordered list specified by the ordering identifier; and unless the next electronic device in the ring is either the computing device or the electronic storage device at which a data record was first presented, the electronic order message is circulated to the next electronic storage device on the ring.

18. The method of claim 17 comprising:

detecting that an electronic order message has been received which identifies the next electronic storage device in the ring as the electronic storage device which first received the data record included in such electronic order message;

generating an order directive including the time that the data record was initially received, an identification of the electronic storage device which initially received the data record, and the assigned ordering identifier; and transmitting the order directive to the next electronic storage device on the ring.

19. The method of claim 18 comprising:
detecting that the computing device has received an order directive from the ring;
generating a commit message in response thereto, the commit message specifying the order identifier previously assigned to a data record;
transmitting the commit message over the ring to the next electronic storage device on the ring; and
authorizing each electronic storage device on the ring which has received the commit message to permit access to the stored data record having the previously assigned order identifier.

20. The method of claim 14 comprising:
detecting that an electronic new record message has circulated entirely around the ring and has reached the computing device;
creating, at the computing device, an order directive corresponding to the electronic new record message, the order directive including the time of receipt, an identification of the electronic storage device to which such received data record was initially presented, and the ordering identifier associated with such message; and
sending the order directive to the next electronic storage device on the ring.

21. The method of claim 20, comprising:
detecting that the computing device has received an order directive from the ring;
generating a commit message in response thereto, the commit message specifying the order identifier previously assigned to a data record;
transmitting the commit message over the ring to the next electronic storage device on the ring; and
authorizing each electronic storage device on the ring which has received the commit message to permit access to the stored data record having the previously assigned order identifier.

* * * * *

UNITED STATES PATENT AND TRADEMARK OFFICE
CERTIFICATE OF CORRECTION

PATENT NO. : 11,609,931 B2
APPLICATION NO. : 16/455336
DATED : March 21, 2023
INVENTOR(S) : Boaz Sedan and Geraud Louis Boyer It is certified that error appears in the above-identified patent and that said Letters Patent is hereby corrected as shown below:

In the Claims

Column 21, Line 37, in Claim 13:
After "electronic" insert -- storage --.

Signed and Sealed this
Twenty-third Day of May, 2023

Katherine Kelly Vidal
*Director of the United States Patent and Trademark Office*